United States Patent

[11] 3,616,990

| [72] | Inventor | Joseph J. Powell<br>87-50 Kingston Place, Jamaica, N.Y. 11432 |
|---|---|---|
| [21] | Appl. No. | 820,928 |
| [22] | Filed | May 1, 1969 |
| [45] | Patented | Nov. 2, 1971 |

[54] EASY-TEAR ARRANGEMENT FOR STRETCHABLE PLASTIC FILM
9 Claims, 10 Drawing Figs.

[52] U.S. Cl. .................................................. 229/66,
229/3.5 R, 229/51 AS, 229/53, 161/39, 161/40,
161/44, 161/109, 161/127, 161/139, 161/149,
161/160
[51] Int. Cl. ........................................................ B65d 17/00,
B65d 11/00, B32b 3/10
[50] Field of Search ........................................... 229/51 A,
51 S, 51 IS, 66; 161/109, 112, 39, 41, 55, 60, 44,
139, 127, 160

[56] References Cited
UNITED STATES PATENTS

| 1,827,636 | 10/1931 | Ames | 229/51 |
|---|---|---|---|
| 2,250,875 | 7/1941 | McConnell | 229/51 |
| 2,946,434 | 7/1960 | Brina | 229/51 |
| 3,098,601 | 7/1963 | Anderson et al. | 229/51 |
| 3,179,326 | 4/1965 | Underwood et al. | 229/51 |
| 3,311,032 | 3/1967 | Lucas | 229/51 |

FOREIGN PATENTS

| 552,865 | 4/1943 | Great Britain | 229/51 |

Primary Examiner—John T. Goolkasian
Assistant Examiner—Willard E. Hoag
Attorney—Karl F. Ross ABSTRACT: In order to make a plastic film easy to tear along a regular predetermined line, the film is laminated with a relatively nonstretchable strip. This strip can be of paper or textile and can be subdivided, scored or perforated to define the predetermined tear line. Furthermore, two strips of such nonstretchable material which lie next to each other with a maximum spacing much less than the width of the strip are used to provide a tear line between them.

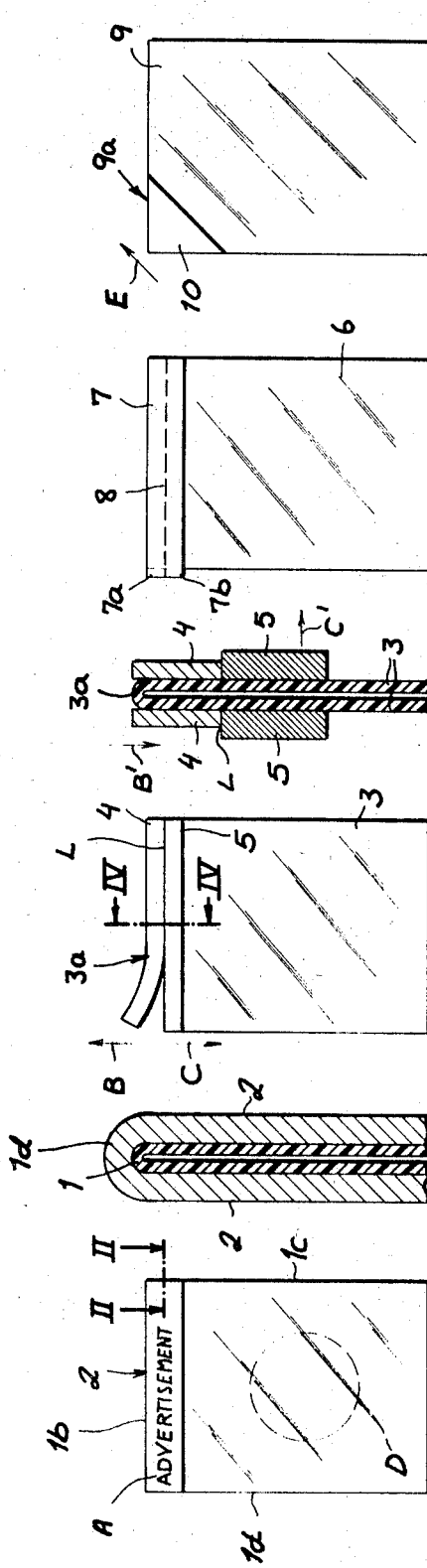
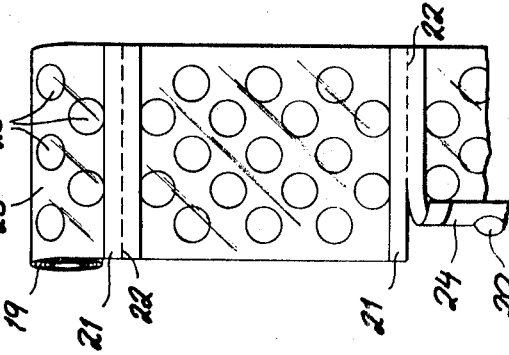
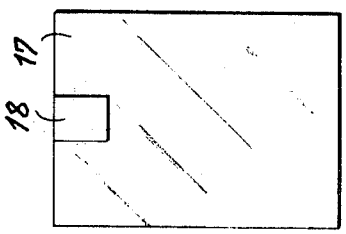

EASY-TEAR ARRANGEMENT FOR STRETCHABLE PLASTIC FILM

My invention relates to an easy-tear arrangement for plastic film material.

BACKGROUND OF THE INVENTION

A plastic film (e.g. of polyethylene) is virtually impossible to tear directly along a straight or other regular line. This is due to the fact that two forces applied in opposite directions in shear or tension over an area of such a film or thin sheet cause the material to deform and stretch plastically until its elastic limit is finally passed, whereupon a tear or separation starts. This tear can begin anywhere in the deformed, stretched area (usually at the weakest point produced by thickness reduction) and will not necessarily run normal to the tearing forces applied except in the most general sense. Thus, even with evenly and carefully applied forces, it is not possible to tear a plastic film along a straight line due to its stretchability.

As a result of this, in order to open a plastic bag or to separate a length of plastic film from a roll it is necessary to employ some sharp instrument. The need for a separate cutting tool is obviously bothersome and often such tools are not available.

A further solution for the above problem has been to perforate or score the bag or film. This allows reasonably regular tearing of the plastic, but the film itself—whether used in the construction of a plastic bag or simply to wrap something—is weakened. Perforations and the like break the desired seal, cause the bag to leak in both directions, and otherwise limit the utility of the package for the storage of foodstuffs, etc.

With ever increasing use of plastic film material, in particular for bags, these problems have become more and more important.

OBJECTS OF THE INVENTION

It is therefore a principal object of my invention to provide an arrangement or means which allows a person to tear by hand stretchable plastic film material along a predetermined parting line.

Another object is to provide an easy-tear arrangement for bags made of such plastic film wherein the bags are in no way weakened or damaged.

A further object is to provide an arrangement of the character described which is both inexpensive and simple to manufacture, easy to use, and avoids the need for a sharp instrument or like tool for separating the film.

Yet another object is to provide an improvement in a method of producing plastic film material, in particular plastic bags, wherein the finished product is easy to tear by hand along a predetermined, preferably straight, path or parting line.

BRIEF DESCRIPTION OF THE INVENTION

I attain these and other objects by an arrangement which is not based on the idea of altering the strength of highly stretchable film material along a predetermined tear path as in the above-cited prior art attempts, but is based on my discovery that by limiting the stretchability of such a film along a predetermined tear line, an even tear or separation can be carried out by the application of shear forces in the region of limited stretchability.

Thus, I have found that laminating a layer or strip of relatively nonstretchable material on a plastic film makes this latter almost as easy to tear as if it were nonstretchable itself. Thus, simply bonding a strip of paper on a plastic (e.g. polyethylene or Saran-type) film solves the many above-mentioned problems without the necessity of weakening the film in any way.

Furthermore, this layer of relatively nonstretchable material is provided with perforations, scored or subdivided in whole or in part to best define the intended tear.

Surprising and extremely satisfactory results have been obtained when the tear-facilitating strip is subdivided transversely into two bands parallel to one another on the film with longitudinal edges or sides just touching or with a maximum spacing of say 5 times the thickness of the tear strip. The line of division thus formed between them provides an excellent tear line along which the material can be easily torn in a substantially perfect line with virtually no ragged edges and the quality of a severed edge. When such an arrangement is applied to a plastic bag, it provides a further advantage in that the band remaining on the bag forms a durable sort of collar around the open end of the bag.

With each of these arrangements, the plastic film can be torn just as easily as a relatively nonstretchable material such as paper, while still guarding all of the advantages—water tightness, ruggedness, light weight—of a simple plastic film with a maximum thickness of several mils.

BRIEF DESCRIPTION OF THE DRAWING

These and other objects, features and advantages of my invention will become more readily apparent from the following description, reference being made to the accompanying drawing in which:

FIG. 1 is a front view of a plastic bag provided with an easy-tear arrangement according to my invention;

FIG. 2 is a section along line II—II of FIG. 1 in enlarged scale;

FIG. 3 is a front view of a further embodiment of a bag with a two-band easy-tear arrangement according to my invention;

FIG. 4 is a section along line IV—IV of FIG. 3, in enlarged scale;

FIGS. 5 through 9 are front views of further embodiments of easy-tear plastic bags according to my invention; and FIG. 10 shows in top view a roll of cell-type insulating material made of plastic film and provided with the easy-tear arrangement of my invention.

SPECIFIC DESCRIPTION

In FIGS. 1 and 2, a plastic bag 1 made of a stretchable polyethylene film having a thickness $t$ of about 2 mils has a heat-sealed bottom $1a$, top $1b$, and side $1c$. Its side $1c$ is simply the folded edge of the film. Around the upper end of the bag 1. I provide a paper strip 2 (bonded to the film by an adhesive or heat-sealed thereto) with a thickness $T$ of 5 mils. Within this bag 1 is some article D which may be described on the paper strip 2 by an advertisement A.

In order to open this bag 1, the strip 2 is simply torn inwardly from an edge $1c$ or $1d$ at which the strip terminates and parallel to an edge $1a$ or $1b$ as much or as little as desired, until the entire upper end of the bag is removed or the intended opening is made. The tear strip 2 may be weakened over part of its length, e.g. along the dot-dash section line II—II to facilitate beginning the tear.

FIGS. 3 and 4 show a bag 3 whose upper heat-sealed end $3a$ has two parallel, contiguous bands 4 and 5, together forming a tear strip, bonded around it. The strip band 5 is advantageously thicker than the band 4 and the two define a tear line L between them. This bag 3 is opened by pulling the bands 4 and 5 in the directions of arrows B and C respectively and preferably in opposite directions transverse to the plane of the bag as shown by arrows B′ and C′ which causes the plastic film of the bag 3 to part perfectly along the line 1 since the strips here are advantageously of a material that resists tearing itself. The bands 4 and 5 are advantageously adhesively bonded to the bag 3 in contact with one another along the longitudinal tear line.

In FIG. 5 a polyethylene bag is shown which has its upper end bonded to a strip 7. This strip 7 is formed longitudinally with perforations 8 and may extend beyond the edge of the bag 6 to form two small tabs $7a$ and $7b$. Pulling these tabs $7a$ and $7b$ apart causes the strip 7 to rip along the perforations 8 and the bag 6 to tear along the line defined by these perforations which do not penetrate the bag film or weaken it.

FIG. 6 shows a polyethylene plastic bag 9 which is particularly adapted to hold liquids or flowable solids. Its one corner 9a is bonded to a stiff but tearable textile triangular cap 10. The weave of this cap 10 (which may be composed of sized or plastic-coated gauze) runs in the direction of arrow E such that the corner of the bag 9 can easily be torn off to allow for pouring from the corner 9a.

In FIG. 7 a bag 11 is seen which has two strips 12 and 13 defining a diagonal tearing line L' in its upper corner. This structure here is similar to that of FIGS. 3 and 5 and the use is also the same. Here, however, tearing along the line L' removes a corner of the bag 11 which can be later easily closed up by a tie wire as is well known in the art.

FIG. 8 shows a bag 14 with a cap 15 like the cap 10 of FIG. 6, except here perforations 16 are provided for easy tearing. The extreme corner of the bag 14 can be thus torn off as the top of the bag 7 of FIG. 5. While the perforations 16 span the full length of the tear strip, it will be understood that only a minor length of starting perforations at one edge or both may be used.

Where it is only desired to open a small hole or slot in one side of a closed bag, the embodiment shown in FIG. 9 is useful. Here a bag 17 of, once again, polyethylene film has a small patch 18 of paper glued over its upper edge. This patch 18 can be easily torn between the fingers to open a small hole in the bag 17. Of course, this patch 18 can be made up of two strips as in FIGS. 3 and 7 or with perforations as in FIGS. 5 and 8.

FIG. 10 shows a roll 19 of insulating-packaging material which consists of two saran-coated polyethylene films 23 and 24, with cells or bubbles 20 formed in the film 24. Such a material is described in U.S. Pat. No. 3,285,793, issued on 15 Nov. 1966 and entitled "METHOD OF MANUFACTURING A COMPOSITE CELLULAR MATERIAL." This packaging material is difficult to cut, some sharp instrument being required. According to my invention, the flat film 23 is layered with strips 21 of paper formed with perforations 22. These strips 21 are regularly spaced along the film and the perforations 22 permit lengths of the material to be torn off like paper towels. What is more, should a piece be torn off which extends over several strips 21, the perforations 22 (which do not extend into the film) will not cause the air to leak from the cells 20 under untorn strips and the effectiveness of the packing material to be adversely affected.

Of course, the concept of FIG. 10 applies equally to rolls of smooth or otherwise formed plastic film. The basic idea is that strips like the strips 21 allow such normally hard-to-tear material to be easily torn.

Note that only one side of a plastic stretchable film need be equipped with a relatively nonstretchable strip or layer according to the invention.

Although I have shown here strips consisting only of paper or textile adhesively bonded to the film, it is to be understood that my invention consists in the idea of limiting the stretchability of a plastic film to make it tearable. This can also be done chemically by, for example, painting a strip of lacquer on the film to inhibit its stretching according to the invention.

The improvement described and illustrated is believed to admit of many modifications within the ability of persons skilled in the art, all such modifications being considered within the spirit and scope of the invention except as limited by the appended claims.

I claim:

1. A foil assembly comprising a sheet of stretchable, snythetic-resin film having a pair of edges and carrying means to facilitate tearing said sheet, said means consisting essentially of a pair of contiguous and coextensive strips which are significantly less stretchable than said film, said strips extending next to each other from one of said edges to the other of said edges, said strips being bonded to said sheet along their full lengths and having laterally abutting confronting sides defining a tear line, whereby said sheet is adapted to be severed along said tear line by lateral separation of said strips.

2. The foil assembly defined in claim 1 wherein said sheet forms one face of a bag and said strips are bands extending fully across and parallel to a border of said bag.

3. The foil assembly defined in claim 2 wherein said sides of said strips are joined at regular intervals, thereby forming perforations.

4. The foil assembly defined in claim 1 wherein said sheet forms one face of a bag, said strips extending diagonally across a corner of said bag.

5. The foil assembly defined in claim 1 wherein said sheet is of substantially even width, said strips extending between longitudinal edges of said sheet.

6. The foil assembly defined in claim 5, further comprising a second sheet of snythetic-resin film bonded to said first-mentioned sheet and forming a plurality of airtight cells therewith.

7. The foil assembly defined in claim 1 wherein said strips consist of paper adhesively bonded to said film.

8. The foil assembly defined in claim 1 wherein said film is made of polyethylene.

9. A foil assembly comprising a pair of coextensive sheets of stretchable snythetic-resin film joined around all of their edges to form a bag and said film having adhered thereto means to facilitate tearing said film consisting essentially of a pair of contiguous and coextensive strips which are significantly less stretchable than said film, said strips extending next to each other diagonally across a corner of said bag from one of the bag edges to another of the bag edges, said strips being attached to at least one of said sheets along their full lengths and having laterally abutting confronting sides defining a tear line, whereby said film is adapted to be severed along said tear line by lateral separation of said strips.